Figure 1:
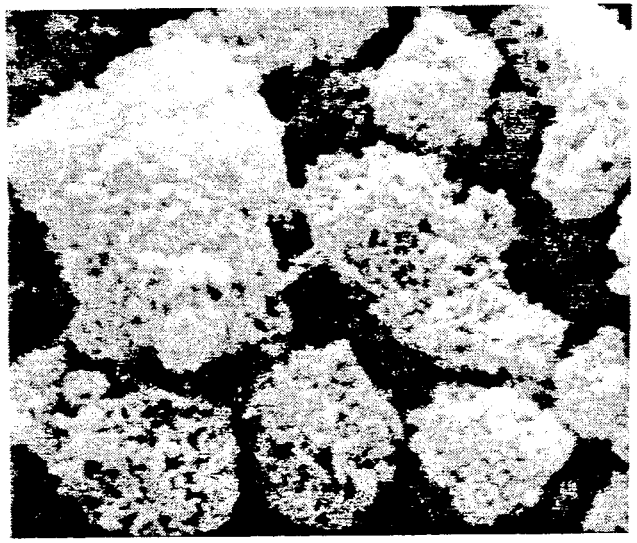

United States Patent [19]

Tsukisaka et al.

[11] Patent Number: 5,007,964

[45] Date of Patent: Apr. 16, 1991

[54] CALCIUM CARBONATE, CALCIUM CARBONATE PIGMENT, PROCESS FOR PREPARING SAME, COATING COMPOSITION FOR INFORMATION RECORDING PAPER AND INFORMATION RECORDING PAPER

[75] Inventors: Ryogo Tsukisaka, Takarazuka; Satoshi Kondo, Nishinomiya; Toshio Kaneguchi, Kobe; Takashi Deguchi, Nishinomiya, all of Japan

[73] Assignee: Shiraishi Central Laboratories Co., Ltd., Hyogo, Japan

[21] Appl. No.: 296,963

[22] Filed: Jan. 13, 1989

[30] Foreign Application Priority Data

Mar. 9, 1988 [JP] Japan .................................. 63-55476

[51] Int. Cl.$^5$ .............................................. C09C 1/02
[52] U.S. Cl. ..................................... 106/464; 106/465; 423/430; 423/432
[58] Field of Search ................ 106/464, 465; 423/430, 423/432

[56] References Cited

U.S. PATENT DOCUMENTS

| | | | |
|---|---|---|---|
| 3,126,253 | 3/1964 | Podschus | 423/432 |
| 3,133,824 | 5/1964 | Podschus | 106/464 |
| 3,152,001 | 10/1964 | Podschus | 106/464 |
| 4,018,877 | 4/1977 | Woode | 423/432 |
| 4,157,379 | 6/1979 | Arika et al. | 423/430 |
| 4,244,933 | 1/1981 | Shibazaki et al. | 106/464 |
| 4,367,207 | 1/1983 | Vanderheiden | 423/432 |
| 4,714,603 | 12/1987 | Vanderheiden | 423/430 |
| 4,888,160 | 12/1989 | Kosin et al. | 423/430 |
| 4,892,590 | 1/1990 | Gill et al. | 106/464 |

FOREIGN PATENT DOCUMENTS

| | | | |
|---|---|---|---|
| 0164370 | 9/1964 | Japan | 106/464 |
| 2145074B | 8/1986 | United Kingdom . | |

OTHER PUBLICATIONS

"Calcium Carbonate Extender Pigments", Siesholtz et al., pp. 390–395.

Primary Examiner—Mark L. Bell
Assistant Examiner—Helene Klemanski
Attorney, Agent, or Firm—Larson and Taylor

[57] ABSTRACT

Disclosed is a calcium carbonate which is 25 to 55 m$^2$/g in BET specific surface area, 5 to 110 in the ratio of BET specific surface area (m$^2$/g)/mean particle size ($\mu$m), at least 120 ml/100 g in oil absorption as determined by the Ogura method and at least 1.8 g/g in water absorption, and process for preparing the same. The calcium carbonate is formulated into a coating composition for forming a heat-sensitive recording layer or intermediate layer of a heat-sensitive recording paper or for forming an ink-jet recording paper.

7 Claims, 1 Drawing Sheet

CALCIUM CARBONATE, CALCIUM CARBONATE PIGMENT, PROCESS FOR PREPARING SAME, COATING COMPOSITION FOR INFORMATION RECORDING PAPER AND INFORMATION RECORDING PAPER

The present invention relates to calcium carbonate having high ability to absorb oil and water, calcium carbonate pigment having high ability to absorb oil and water, a process for preparing the carbonate or pigment, coating compositions comprising the calcium carbonate for information recording paper, and information recording paper coated with the composition.

Calcium carbonate is widely used as a pigment for papers, coating compositions, inks, etc. and also as a filler for rubbers, plastics, papers, sealing materials, etc. Calcium carbonates include precipitated calcium carbonate and ground calcium carbonate which are up to 10 $m^2/g$ in BET specific surface area, and fine calcium carbonate in excess of 10 $m^2/g$ in BET specific surface area. Such calcium carbonates are all up to 60 ml/100 g in oil absorption.

In recent years, calcium carbonate is used also as a pigment for the coating layer of information recording papers such as heat-sensitive recording paper and ink-jet recording paper. When the heat-sensitive recording paper is heated as by the thermal head of a heat-sensitive facsimile system or heat-sensitive printer to develop a color for printing, a higher fatty acid amide or like chromogenic sensitivity adjusting agent adheres to the thermal head as residual matter (hereinafter referred to as "residue") to obscure the printed characters, so that calcium carbonate is incorporated in the coating composition for such paper to inhibit or prevent the adhesion of the residue. Calcium carbonate is incorporated in the coating composition for ink-jet recording paper to cause the paper to rapidly absorb the applied ink, thereby giving improved sharpness to the print and assuring speedy recording.

The calcium carbonates having relatively high ability to absorb oil and water heretofore known include calcium carbonate particles having projections and disclosed in Examined Japanese Patent Publication SHO 57-30815, calcium carbonate crystals disclosed in Examined Japanese Patent Publication SHO 57-31530, and calcium carbonate crystals disclosed in Unexamined Japanese Patent Publication SHO 59-232916. These calcium carbonates are up to 100 ml/100 g in oil absorption and up to about 1.7 g/g in water absorption.

These known calcium carbonates have relatively good properties for use as a pigment for the coating layer of information recording paper but ar not always fully satisfactory in the contemplated effect. It is desired to develop calcium carbonate capable of producing more satisfactory effect.

We have conducted intensive research to provide a calcium carbonate capable of absorbing larger quantities of oil and water than the conventional calcium carbonates. Consequently, we have found that a calcium carbonate having high ability to absorb oil and water, a BET specific surface area in a specified range and a BET specific surface area/mean particle size ratio in a specified range can be obtained from an aqueous suspension of calcium hydroxide containing a specified additive and having a specified concentration and a specified temperature, by the first carbonation step of introducing a gas containing carbon dioxide into the suspension to effect carbonation and thereby form fine chain-like particles of calcium carbonate, and the second carbonation step of introducing a gas containing carbon dioxide into the resulting reaction mixture with addition of a chelating agent to agglomerate the fine chain-like particles of calcium carbonate while partly growing the particles and thereby obtain porous agglomerates. We have also found that the calcium carbonate thus prepared has various advantages for use as a pigment for the coating layer of information recording paper. The present invention has been accomplished based on these findings.

More specifically, the invention provides a calcium carbonate which is 25 to 55 $m^2/g$ in BET specific surface area, 5 to 110 in the ratio of BET specific surface area ($m^2/g$)/mean particle size ($\mu m$), at least 120 ml/100 g in oil absorption as determined by the Ogura method and at least 1.8 g/g in water absorption.

The invention further provides a calcium carbonate pigment which is 25 to 55 $m^2/g$ in BET specific surface area, 5 to 110 in the ratio of BET specific surface area ($m^2/g$)/mean particle size ($\mu m$), at least 120 ml/100 g in oil absorption as determined by the Ogura method and at least 1.8 g/g in water absorption.

The invention further provides a process for preparing the calcium carbonate characterized in that the process comprises:

(i) the first carbonation step of introducing a gas containing at least 15 vol. % of carbon dioxide into an aqueous suspension of calcium hydroxide containing at least one member selected from the group consisting of chelating agents and water-soluble salts of anionic high-molecular-weight compounds and having a concentration of 3 to 20 wt. % and a temperature of 17° to 38° C., at a flow rate of at least 25 liters/min per kilogram of the calcium hydroxide to effect carbonation to a carbonation degree of 75 to 95%, and (ii) the second carbonation step of adding a chelating agent to the resulting aqueous suspension and introducing a gas containing at least 10 vol. % of carbon dioxide into the mixture at a flow rate of 5 to 25 liters/min per kilogram of the calcium hydroxide to effect carbonation.

The invention further provides a coating composition for information recording paper characterized in that the composition comprises 5 to 90 wt. % of the calcium carbonate thus obtained.

Throughout the specification and claims, the BET specific surface area was determined by the low-temperature nitrogen adsorption method (see "Particle Size Determination Techniques," edited by the Research Association of Powder Technology, Nikkan Kogyo Press, 1st edition, 1975, pp. 299–305). The term "mean particle size" refers to a median diameter measured by the light transmission particle size determination method (see "Particle Size Determination Techniques," edited by the Research Association of Powder Technology, Nikkan Kogyo Press, 1st edition, 1975, pp. 161–185). The oil absorption was determined by the Ogura method (see Junzo Matsumoto and Masateru Ogura, "Pigments, Coloring Materials and Inks," Kyoritsu Shuppan Co., Ltd., 4th print, 1950, pp. 66–67, with use of boiled linseed oil according to JIS K 5421). The water absorption is determined by the following method. A 15.2-ml cylindrical container having about 100 pores in its bottom is inserted into a cylinder with filter paper placed over the bottom of the container. Calcium carbonate in an amount of 3 to 7 g measured out is placed on the filter paper within the container, and a piston (weighing 1020 g) is gently inserted into the cylinder to completely pack the container with the carbonate under the pressure of the piston. Next, the cylindrical container is withdrawn from the cylinder, dipped in water at room temperature under atmospheric pressure (with the container bottom held at a depth of 3 to 4 mm from the water level) and allowed to stand in this state for 10 minutes to cause the cylindrical block of calcium carbonate to absorb water through the pores. Subsequently, the container is drawn out from the water and allowed to stand on filter paper for 5 minutes, and the water drops are wiped off the side and bottom walls of the container with filter paper. The amount of absorbed water per gram of the calcium carbonate is calculated from the difference in weight before and after the absorption of water. The carbonation degree is defined by the following equation:

Carbonation degree $(\%) = 100 \times W/(W + W_1)$
wherein W is the weight of calcium carbonate in the reaction mixture, and $W_1$ is the weight of calcium hydroxide in the reaction mixture.

The accompanying drawing, FIG. 1, is a photomicrograph (10,000X) of the calcium carbonate of the invention, which reveals porous agglomerates of fine chain-like particles and twining about one another three-dimensionally irregularly. The calcium carbonate of the invention is as high as at least 120 ml/100 g, particularly about 120 to about 220 ml/100 g, in oil absorption (by the Ogura method) and is also as high as at least 1.8 g/g, particularly about 1.8 to about 2.8 g/g, in water absorption. These high values appear attributable to the porous structure shown in the photomicrograph. The present calcium carbonate is about 0.5 to about 5 $\mu$m in mean particle size. The chain-like particles constituting the calcium carbonate of the invention comprises primary particles (which are approximately cubic and have a mean particle size of about 0.02 to about 0.08 $\mu$m as measured electron microscopically) which are aligned in the form of chains, and have an average aspect ratio of about 3 to about 40. The term "aspect ratio" refers to the ratio of the length L of the chain-like particle to the width D thereof, i.e. L/D.

Table 1 shows the physical properties of the highly oil- and water-absorbent calcium carbonate of the invention, in comparison with those of known calcium carbonate.

Table 1 shows that the calcium carbonate of the invention differs from the known calcium carbonates in oil absorption, water absorption, BET specific surface area, BET specific surface area/mean particle size ratio and other properties. The particles of the present carbonate also differ greatly from those of the known ones in shape and construction.

It appears that the properties of the calcium carbonate of the invention involve the following correlation. When the BET specific surface area is less than 25 m$^2$/g and the ratio of BET specific surface area (m$^2$/g)/mean particle size ($\mu$m) is lower than 5, the carbonate is not in the form of porous agglomerates and exhibits lower oil absorption, whereas if the BET specific surface area is above 55 m$^2$/g or if the ratio of BET specific surface area (m$^2$/g)/mean particle size ($\mu$m) is above 110, the agglomerates have a higher density, are not porous and exhibit low ability to absorb oil and water.

The calcium carbonate of the present invention is prepared by the following process. In the first carbonation step, a gas containing carbon dioxide is introduced at a specified rate into an aqueous suspension of calcium hydroxide containing at least one member selected from the group consisting of chelating agents and water-soluble salts of anionic high-molecular-weight compounds and having a specified concentration and a specified temperature to effect carbonation and to form chain-like particles. Subsequently in the second carbonation step, a chelating agent is added to the reaction mixture from the first carbonation step, and a gas containing carbon dioxide is introduced into the mixture under specified conditions to effect carbonation, whereby the chain-like particles are agglomerated (while permitting further growth of some of the particles) to give a calcium carbonate in the form of porous agglomerates and having high ability to absorb oil and water according to the invention.

Examples of chelating agents useful for the first carbonation step of the invention are hydroxycarboxylic acids such as citric acid and malic acid, polyhydroxycarboxylic acids such as gluconic acid and tartaric acid, aminopoly-carboxylic acids such as iminodiacetic acid, ethylenediamine-tetraacetic acid and nitrilotriacetic acid and alkali metal salts thereof, alkali metal salts of polyphosphoric acids such as hexametaphosphoric acid and tripolyphosphoric acid, amino acids such as glutamic acid, aspartic acid and alkali metal salts

TABLE 1

| Properties | Calcium carbonate of the invention | Known calcium carbonate | | | |
|---|---|---|---|---|---|
| | | A | B | C | D |
| BET specific surface area (m$^2$/g) | 25–55 | 5–15 | 6 | 16 | 11 |
| BET specific surface area (m$^2$/g)/ mean particle size ($\mu$m) | 5–110 | 1.3–5 | 1.4 | 4.3 | 20 |
| Oil absorption (ml/100 g) | 120 or more | 80–100 | 59 | 50 | 50 |
| Water absorption (g/g) | 1.80 or more | 1.2–1.7 | 1.20 | 0.79 | 0.83 |
| Apparent volume (ml/g) | 8–15 | 6.5–10 | 4 | 4.3 | 5.9 |

The known calcium carbonates A to D listed in Table 1 are as follows.
A: Calcium carbonate crystals disclosed in Unexamined Japanese Patent Publication SHO 59-232916
B: Light calcium carbonate
C: Fine precipitated calcium carbonate I
D: Fine precipitated calcium carbonate II
The "apparent volume" listed in Table 1 was measured according to JIS K 5101.

thereof, and ketones such as acetylacetone, methyl acetoacetate and allyl acetoacetate. Examples of useful water-soluble salts of anionic high-molecular-weight compounds are alkali metal salts or ammonium salts of isobutylene-maleic acid copolymer, styrene-maleic acid copolymer, acrylic acid-maleic acid copolymer, polyacrylic acid and like high-molecular-weight polycarboxylic acids. In the first carbonation step, at least one compound selected from the group consisting of such chelating agents and water-soluble salts of anionic high-molecular-weight compounds is used in an amount of about 0.2 to about 20 parts by weight, preferably about 0.5 to about 15 parts by weight, per 100 parts by weight of calcium hydroxide. If the amount is less than 0.2 part by weight, fine chain-like particles will not be formed, and the product is likely to have a reduced BET specific surface area. When the amount exceeds 20 parts by weight, it is generally likely that firm agglomerates will be obtained which have an increased BET specific surface area.

The aqueous suspension of calcium hydroxide to be subjected to the first carbonation step generally has a concentration of about 3 to about 20 wt. % and a temperature of about 17° to about 38° C., preferably about 20° to about 35° C. If the concentration is lower than 3% or if the temperature is below 17° C., there is a tendency for the resulting chain-like particles to be considerably slender, leading to too great a specific surface area. If the concentration is higher than 20 wt. % or the temperature is above 38° C., coarser particles will be formed.

In the first carbonation step of the invention, a gas containing carbon dioxide is introduced into the suspension at a flow rate of at least 25 liters/min, preferably about 30 to about 200 liters/min, per kilogram of the calcium hydroxide. It is desired that the gas have a carbon dioxide concentration of at least 15 vol. %. It is industrially advantageous to use a gas containing about 15 to about 40 vol. % of carbon dioxide and obtained by purifying the waste gas from a limestone calcination process. When the flow rate of the carbon dioxide-containing gas is lower than 25 liters/min, it is likely that chain-like particles will not be formed effectively. Flow rates exceeding 200 liters/min will not result in a significantly improved effect. The carbonation reaction of the first step is effected to achieve a carbonation degree of about 75 to about 95%, preferably about 85 to about 90%. If the carbonation degree is lower than 75%, agglomerates of chain-like particles will not be produced effectively in the second carbonation step with a tendency toward lower oil absorption, whereas carbonation degrees exceeding 95% entail the likelihood that in the second carbonation step agglomerates of chain-like particles will not be formed.

It is thought according to the invention that the chelating agent or the water-soluble salt of anionic high-molecular-weight compound is consumed substantially completely by the time the first carbonation step is completed.

In the second carbonation step, the chelating agent mentioned for the first carbonation step is further added to the reaction mixture from the first carbonation step, in an amount of about 0.05 to about 10 parts by weight, preferably about 0.1 to about 8 parts by weight, per 100 parts by weight of the calcium hydroxide initially present at the start of the first carbonation step. With less than 0.05 part by weight of the agent present, it is generally likely that agglomerates will not be formed. Amounts over 10 parts by weight fail to produce porous agglomerates. While the aqueous suspension resulting from the first carbonation step on completion thereof generally has a temperature of about 30° to about 50° C. due to the heat of carbonation reaction, the second carbonation step is not specifically limited in respect of temperature condition, so that the aqueous suspension obtained by the first carbonation step is usable as it is. However, the suspension may have a low temperature, for example, of about 20° C. or a high temperature of about 60° C. In the second carbonation step, a gas containing carbon dioxide is introduced into the aqueous suspension at a flow rate of about 5 to about 25 liters/min, preferably about 7 to about 23 liters/min, per kilogram of the calcium hydroxide initially present at the start of the first carbonation step. Preferably, the gas contains at least 10 vol. % of carbon dioxide. It is industrially advantageous to use a gas containing about 10 to about 40 vol. % of carbon dioxide and obtained by purifying the waste gas from a limestone calcination process. If the flow rate is lower than 5 liters/min, there is a tendency for chain-like particles to form excessively large agglomerates, whereas if the flow rate is higher than 25 liters/min, it becomes difficult for chain-like particles to form agglomerates. The carbonation reaction of the second carbonation step is effected until the pH of the aqueous suspension reaches about 6.5 to about 8.5. It appears that by this time the calcium hydroxide used has been converted substantially entirely to calcium carbonate.

The calcium carbonate of the invention obtained by conducting the first and second carbonation steps may be used in the form of a paste which is obtained by dewatering the suspension resulting from the carbonation reaction by a press, or in the form of a powder prepared by drying the paste and pulverizing the solid. The agglomerates of calcium carbonate particles of the invention of course remain substantially free of breakdown due to the pulverization step.

The calcium carbonate of the invention thus obtained has high ability to absorb oil and water presumably for the following reason. The first carbonation step produces chain-like particles of suitable size. In the second carbonation step, said chain-like particles twine about one another three-dimensionally irregularly to form porous agglomerates of great void ratio, while presumably at least in part growing. These agglomerates are different from those of conventional calcium carbonate which have a high density.

Calcium carbonate having high ability to absorb oil and water such as that of the invention did not exist or was not known.

We have found that the calcium carbonate of the invention thus prepared exhibits excellent performance as a pigment for the coating layer of information recording papers such as heat-sensitive recording paper and ink-jet recording paper because of the foregoing physical properties. Accordingly, the present invention relates also to compositions for information recording papers which comprise 5 to 90 wt. % of the present calcium carbonate based on the total solids. Given below are examples of coating compositions of the invention (1) Composition for forming heat-sensitive recording layer of heat-sensitive recording paper This composition comprises about 5 to about 60 wt. % of the calcium carbonate (pigment) of the invention as admixed with a known colorless to pale-colored basic dye, color developer such as phenolic compound for causing the dye to produce a color when heated, chromogenic sensitivity adjusting agent, binder, etc. The heat-sensitive recording paper obtained with use of the composition is superior to those incorporating the conventional calcium carbonate in respect of color density, effect to remove or absorb residue, ease of handling, effect to inhibit color formation (whiteness retentivity) during storage, etc.

The components of the coating composition for heat-sensitive recording paper other than the present calcium carbonate, i.e. the basic dye, color developer, chromogenic sensitivity adjusting agent, binder, etc. can be a wide variety of those conventionally used for heat-sensitive paper. Typical examples of these components are as follows.

(a) Colorless to pale-colored basic dyes

Triarylmethane dyes such as 3,3-bis(p-dimethylaminophenyl)-6-dimethylaminophthalide, fluoran dyes such as 3-diethylamino-6-metyl-7-anilinofluoran, spiropyran dyes such as 3-methyl-spiro-dinapythopyran, diphenylmethane dyes such as N-halophenyl-leucoauramine, thiazine dyes such as benzoylleucomethyleneblue, etc.

(b) Color developers

Phenolic compounds such as 4-tert-butylphenol, 4-hydroxydiphenoxide, 4,4'-isopropylidenediphenol (bisphenol A), 2,2'-methylenebis(4-chlorophenol) and novolak-type phenolic resins, aromatic carboxylic acids or derivatives thereof such as benzoic acid, p-tert-butylbenzoic acid, p-hydroxybenzoic acid, methyl p-hydroxybenzoate, isopropyl p-hydroxybenzoate, benzyl p-hydroxybenzoate, lauryl gallate, stearyl gallate, salicylanilide, 5-chloro-salicylanilide, 5-tert-butylsalicylic acid, hydroxynaphthoic acid and zinc or like metal salts thereof.

(c) Chromogenic sensitivity adjusting agents

Higher fatty acid amides such as palmitic acid amide, stearic acid amide, oleic acid amide, hydroxystearic acid amide, methylolated fatty acid amide, ethylenebis fatty acid amide and methylenebis fatty acid amide.

(d) Binders

Water-soluble high-molecular-weight compounds such as polyvinyl alcohol, methylcellulose, carboxymethylcellulose, hydroxyethylcellulose, hydroxpropylcellulose, starch, casein, gelatin and gum arabic.

When required, various anxiliary agents for use in known coating compositions for heat-sensitive paper can be further incorporated into the present composition. Examples of such additives are release agents, defoaming agents, ultraviolet absorbers, fluorescent dyes, coloring dyes, preservatives, etc.

The components of the present coating composition and the proportions (solids contents) thereof can be changed according to the contemplated purpose. Usually, the composition comprises the following proportions (solids contents) of components based on the total solids.

| Basic dye | about 3 to about 10 wt. % |
| Color developer | about 15 to about 50 wt. % |
| Chromogenic sensitivity adjusting agent | about 6 to about 30 wt. % |
| Binder | about 16 to about 22 wt. % |
| Calcium carbonate of the invention | about 5 to about 60 wt. % |

The present coating composition can be prepared in a known manner, for example, by the following method. First, the basic dye, color developer and chromogenic sensitivity adjusting agent are each separately milled in an aqueous solution of binder. When a ball mill, for example, is used for this purpose, each component is added to the binder solution usually to a solids concentration of about 15 to about 30 wt. %, and the mill is operated for 2 days to obtain fine particles of about 1 to about 5 μm in size. The calcium carbonate of the invention is dispersed in an aqueous solution of binder in the usual manner using a dispersant to prepare a pigment dispersion containing about 20 to about 30 wt. % of solids. Subsequently, the pigment dispersion and the aqueous suspensions of finely divided components are mixed together in the conventional manner, giving a coating composition for forming the heat-sensitive recording layer of heat-sensitive paper according to the invention. The composition is in the form of a dispersion containing about 15 to about 30 wt. % of solids.

The composition is applied to a substrate and dried in the usual manner, and the coated substrate is calendered when required to afford heat-sensitive paper. The present coating composition is applied usually in an amount of about 3 to about 15 g/m$^2$, preferably about 5 to about 10 g/m$^2$, calculated as dry weight, although the amount is variable, for example with the properties of the heat-sensitive paper to be obtained.

Thus, the present invention provides a heat-sensitive recording paper which is characterized in that it comprises a substrate and a heat-sensitive recording layer formed thereon by applying the above coating composition and drying the resulting coating. Examples of useful substrates are various papers, synthetic resin sheets or films and the like which are conventionally used in the art.

(2) Coating composition for forming intermediate layer between heat-sensitive recording layer of heat-sensitive recording paper and substrate thereof We prepared a coating composition comprising the highly oil- and water-absorbent calcium carbonate of the invention in an amount of about 60 to about 90 wt. % based of the total amount of solids and a binder. Our research has revealed that when this composition is applied to a substrate to form an intermediate layer and a heat-sensitive recording layer is formed over the intermediate layer, the resulting paper exhibits a higher effect to remove residue and is more excellent in color density than when the conventional calcium carbonate is used.

The binder to be used for the coating composition for forming the intermediate layer can be any of the binders already mentioned in item (1) for the heat-sensitive recording layer. Also useful are latices of styrene-butadiene copolymer, polyvinyl acetate, polyurethane, polyacrylic acid, polyacrylate, vinyl chloridevinyl acetate copolymer, polybutyl methacrylate, ethylenevinyl acetate copolymer, styrene-butadiene-acrylic copolymer and the like, when required, the coating composition may have further incorporated therein dispersants, surfactants, defoaming agents, coloring dyes, preservatives, etc.

The proportions of components (calculated as solids) of the coating composition for the intermediate layer, although variable over a wide range, are preferably as follows based on the total solids of the composition.

| Calcium carbonate of the invention | about 60 to about 90 wt. % |
| Binder | about 40 to about 10 wt. % |

The coating composition can be prepared by uniformly dispersing the calcium carbonate of the invention in an aqueous solution of binder in the usual manner using a dispersant or the like to obtain a pigment dispersion containing about 25 to about 35 wt. % of solids. The composition can be applied to a substrate by various methods, for example, by a coater such as steel blade, air knife, roll, flexographic press, Mayer bar or the like. The amount of the composition to be applied, although widely variable, is generally about 1 to about 15 g/m², preferably about 3 to about 10 g/m², calculated as dry weight. The coating, when dried, is preferably calendered.

A heat-sensitive recording layer is formed in the conventional manner over the intermediate layer thus formed, whereby a heat-sensitive recording paper is obtained which is excellent in effect to remove residue, color density and other properties.

Accordingly, the present invention provides a heat-sensitive recording paper comprising the above intermediate layer over a substrate and a heat-sensitive recording layer provided over the intermediate layer. Examples of useful substrates are paper, synthetic resin film, etc. which are conventionally used in the art. The heat-sensitive recording layer can be any of those heretofore known, such as one containing a colorless to pale-colored basic dye, color developer, chromogenic sensitivity adjusting agent, binder, etc. as exemplified in item (1), and various other layers.

(3) Coating composition for ink-jet recording paper

We prepared a coating composition comprising the highly oil- and water-absorbent calcium carbonate of the invention in an amount of about 60 to about 90 wt. % based on the total amount of solids and a binder. Our research has revealed that when this composition is applied to a substrate, dried and made smooth-surfaced as by a calender, an ink-jet recording paper is obtained which absorbs ink rapidly, is less likely to permit running of ink and does not permit strike-through, hence excellent characteristics.

Examples of binders useful for the coating composition for the ink-jet recording paper are those heretofore conventionally used in the art and include polyvinyl alcohol, derivatives thereof, oxidized starch, etherified starch, esterified starch, dextrin and like starches, carboxymethylcellulose, hydroxyethylcellulose and like cellulose drivatives, casein, gelatin, soybean protein, maleic anhydride resin, latices of usual styrenebutadiene copolymer, methyl methacrylate-butadiene copolymer and like conjugated diene polymers, and latices of acrylate and methacrylate polymers or copolymers and like acrylic polymers. When required, the coating composition may have further incorporated therein pigment dispersants, tackifier, flowability modifiers, defoaming agents, foaming inhibitors, release agents, coloring agents and the like.

The proportions of components (calculated as solids) of the coaging composition for the ink-jet recording paper are preferably as follows based on the total amount of solids although suitably variable widely.

| Calcium carbonate of the invention | about 60 to about 90 wt. % |
|---|---|
| Binder | about 40 to about 10 wt. % |

The coating composition can be prepared by uniformly dispersing the calcium carbonate of the invention in an aqueous solution of binder in the conventional manner using a dispersant or the like to obtain a pigment dispersion containing about 25 to about 35 wt. % of solids. The composition can be applied to a substrate by various methods, for example, by a blade, air-knife, roll, brush, curtain, Mayer bar, gravure or like coater. The composition is applicable also by the sizing press or gate roll unit on a papermaking machine. The amount of the composition to be applied, although widely variable, is generally about 3 to about 20 g/m², preferably about 5 to about 15 g/m², calculated as dry weight. When dried, the coating is preferably calendered. In this way, an ink-jet recording paper can be obtained which exhibits excellent performance.

Accordingly, the present invention provides an ink-jet recording paper prepared by applying the above coating composition to a substrate. The substrate to be used can be any of paper, thermoplastic synthetic resin film and the like which are conventionally used in the art.

The reason still remains to be clarified why the highly oil- and water-absorbent calcium carbonate used as a pigment for the coating layer of such information recording paper produces the foregoing excellent effects. However, the reason can be explained as follows. The present calcium carbonate has a specific surface area and a mean particle size in the respective specified ranges and is at least 120 ml/100 g in oil absorption and at least 1.8 g/g in water absorption, so that the carbonate forms a information recording coating layer which has miniute uniform voids and a low apparent density unlike the conventional calcium carbonate. Presumably, this results in the outstanding advantages such as the effect of the heat-sensitive paper to remove residue and the rapid absorption of ink by the ink-jet recording paper without strike-through. Further the high color density of the heat-sensitive recording paper appears attributable to the following reason. When the present calcium carbonate is incorporated in the color developing layer of the heat-sensitive paper, the melt (residue) is absorbed uniformly, permitting the dye to form a color uniformly and diminishing the amount of thermally unmeltable substance in the layer to consequently afford an increased color density. When the present calcium carbonate is present in the intermediate layer, this pigment layer functions as an excellent heat insulating layer when a color forming reaction occurs at the surface of the layer, consequently assuring effective color formation at a high density. The coating layer incorporating the bulky calcium carbonate of the invention having specified properties is homogeneous and low in density to give the resulting paper excellent properties such as a high degree of whiteness and opacity while making the paper preservable effectively.

The present invention will be described in greater detail with reference to the following examples, in which the parts and percentages are all by weight unless otherwise specified.

EXAMPLE 1

(i) A 1000 kg quantity of an aqueous suspension of calcium hydroxide (lime milk) adjusted to a concentration of 5 wt. % and a temperature of 30° C. was placed into a reactor, and 3.5 kg of an aqueous solution of trisodium nitrilotriacetate adjusted to a concentration of 10 wt. % was admixed with the suspension. Carbon dioxide gas having a concentration of 30 vol. % was then introduced into the mixture at a flow rate of 35 liters/min per kilogram of the calcium hydroxide to effect carbonation to a carbonation degree of 80 %.

(ii) Subsequently, 1.5 kg of an aqueous solution of trisodium nitrilotriacetate adjusted to a concentration of 10 wt. % was added to the resulting mixture, and carbon dioxide gas having a concentration of 30 vol. % was introduced into the mixture at a rate of 20 liters/min per kilogram of the calcium hydroxide (initially present at the start of step (i) above) to effect carbonation until the pH of the mixture reached 7.0. The calcium carbonate suspension obtained was dewatered by a press. The solid product was then dried and pulverized, giving 65 kg of calcium carbonate having high ability to absorb oil and water according to the invention.

EXAMPLES 2-5

Calcium carbonate of the invention was prepared in the same manner as in Example 1 with the exception of using the conditions listed in Table 2.

In Table 2 and also in the tables to follow, the flow rate of $CO_2$-containing gas is a rate per kilogram of calcium hydroxide initially present at the start of the first carbonation step.

TABLE 2

| | Example | | |
|---|---|---|---|
| | 1 | 2 | 3 |
| First carbonation step | | | |
| Lime milk | | | |
| Conc. (wt. %) | 5 | 7 | 15 |
| Temp. (°C.) | 30 | 25 | 20 |
| Charge (kg) | 1000 | 1000 | 1000 |
| Additive aqueous solution | | | |
| Kind | Trisodium nitrilotriacetate | Sodium malate | Citric acid |
| Conc. (wt. %) | 10 | 10 | 10 |
| Amount (kg) | 3.5 | 35 | 150 |
| $CO_2$-containing gas | | | |
| Conc. (v %) | 30 | 30 | 30 |
| Flow rate (l/min) | 35 | 40 | 80 |
| Carbonation degree (%) | 80 | 88 | 93 |
| Second carbonation step | | | |
| Additive aqueous solution | | | |
| Kind | Trisodium nitrilotriacetate | Citric acid | Disodium iminodiacetate |
| Conc. (wt. %) | 10 | 10 | 10 |
| Amount (kg) | 1.5 | 14 | 45 |
| $CO_2$-containing gas | | | |
| Conc. (v %) | 30 | 30 | 30 |
| Flow rate (l/min) | 20 | 25 | 20 |
| pH at the end of reaction | 7.0 | 7.5 | 8.2 |
| Yield (kg) | 65 | 94 | 200 |

| | Example | |
|---|---|---|
| | 4 | 5 |
| First carbonation step | | |
| Lime milk | | |
| Conc. (wt. %) | 10 | 7 |
| Temp. (°C.) | 22 | 33 |
| Charge (kg) | 1000 | 1000 |
| Additive aqueous solution | | |
| Kind | Sodium polyacrylate | Disodium ethylenediaminetetraacetate |
| Conc. (wt. %) | 10 | 10 |
| Amount (kg) | 70 | 21 |
| $CO_2$-containing gas | | |
| Conc. (v %) | 30 | 30 |
| Flow rate (l/min) | 100 | 50 |
| Carbonation degree (%) | 85 | 78 |
| Second carbonation step | | |
| Additive aqueous solution | | |
| Kind | Tartaric acid | Sodium tripolyphosphate |
| Conc. (wt. %) | 10 | 10 |
| Amount (kg) | 15 | 7 |
| $CO_2$-containing gas | | |
| Conc. (v %) | 30 | 30 |
| Flow rate (l/min) | 25 | 15 |
| pH at the end of reaction | 7.8 | 6.8 |
| Yield (kg) | 130 | 100 |

COMPARATIVE EXAMPLES 1-8

Comparative calcium carbonate was prepared in the same manner as a Example 1 with the exception of using the conditions listed in Table 3.

TABLE 3

| | Comparative Example | |
|---|---|---|
| | 1 | 2 |
| First carbonation step | | |
| Lime milk | | |
| Conc. (wt. %) | 5 | 5 |
| Temp. (°C.) | 30 | 30 |
| Charge (kg) | 1000 | 1000 |
| Additive aqueous solution | | |
| Kind | Trisodium nitrilotriacetate | — |
| Conc. (wt. %) | 10 | — |
| Amount (kg) | 3.5 | — |
| $CO_2$-containing gas | | |
| Conc. (v %) | 30 | 30 |
| Flow rate (l/min) | 35 | 35 |
| Carbonation degree (%) | 80 | 80 |
| Second carbonation step | | |
| Additive aqueous solution | | |
| Kind | — | Trisodium nitrilotriacetate |
| Conc. (wt. %) | — | 10 |
| Amount (kg) | — | 1.5 |
| $CO_2$-containing gas | | |
| Conc. (v %) | 30 | 30 |
| Flow rate (l/min) | 20 | 20 |
| pH at the end of reaction | 7.5 | 7.2 |
| Yield (kg) | 65 | 65 |

| | Comparative Example | |
|---|---|---|
| | 3 | 4 |
| First carbonation step | | |
| Lime milk | | |
| Conc. (wt. %) | 5 | 5 |
| Temp. (°C.) | 30 | 30 |
| Charge (kg) | 1000 | 1000 |
| Additive aqueous solution | | |
| Kind | Trisodium nitrilotriacetate | Trisodium Nitrilotriacetate |
| Conc. (wt. %) | 10 | 10 |
| Amount (kg) | 0.75 | 3.5 |
| $CO_2$-containing gas | | |
| Conc. (v %) | 30 | 30 |
| Flow rate (l/min) | 35 | 35 |
| Carbonation degree (%) | 80 | 80 |
| Second carbonation step | | |
| Additive aqueous solution | | |
| Kind | Trisodium nitrilotriacetate | Trisodium nitrilotriacetate |
| Conc. (wt. %) | 10 | 10 |

TABLE 3-continued

|  | | |
|---|---|---|
|  | 1.5 | 0.15 |
| $CO_2$-containing gas | | |
| Conc. (v %) | 30 | 30 |
| Flow rate (l/min) | 20 | 20 |
| pH at the end of reaction | 7.6 | 8.2 |
| Yield (kg) | 65 | 65 |

|  | Comparative Example | |
|---|---|---|
|  | 5 | 6 |
| First carbonation step | | |
| Lime milk | | |
| Conc. (wt. %) | 15 | 15 |
| Temp. (°C.) | 20 | 20 |
| Charge (kg) | 1000 | 1000 |
| Additive aqueous solution | | |
| Kind | Citric acid | Citric acid |
| Conc. (wt. %) | 10 | 10 |
| Amount (kg) | 345 | 150 |
| $CO_2$-containing gas | | |
| Conc. (v %) | 30 | 30 |
| Flow rate (l/min) | 80 | 80 |
| Carbonation degree (%) | 93 | 93 |
| Second carbonation step | | |
| Additive aqueous solution | | |
| Kind | Iminodiacetic acid | Iminodiacetic acid |
| Conc. (wt. %) | 10 | 10 |
|  | 45 | 180 |
| $CO_2$-containing gas | | |
| Conc. (v %) | 30 | 30 |
| Flow rate (l/min) | 20 | 20 |
| pH at the end of reaction | 6.8 | 7.0 |
| Yield (kg) | 200 | 200 |

|  | Comparative Example | |
|---|---|---|
|  | 7 | 8 |
| First carbonation step | | |
| Lime milk | | |
| Conc. (wt. %) | 5 | 5 |
| Temp. (°C.) | 30 | 30 |
| Charge (kg) | 1000 | 1000 |
| Additive aqueous solution | | |
| Kind | Trisodium nitrilo-triacetate | Trisodium Nitrilo-triacetate |
| Conc. (wt. %) | 10 | 10 |
| Amount (kg) | 35 | 3.5 |
| $CO_2$-containing gas | | |
| Conc. (v %) | 30 | 30 |
| Flow rate (l/min) | 35 | 35 |
| Carbonation degree (%) | 70 | 98 |
| Second carbonation step | | |
| Additive aqueous solution | | |
| Kind | Trisodium nitrilo-triacetate | Trisodium nitrilo-triacetate |
| Conc. (wt. %) | 10 | 10 |
|  | 1.5 | 1.5 |
| $CO_2$-containing gas | | |
| Conc. (v %) | 30 | 30 |
| Flow rate (l/min) | 20 | 20 |
| pH at the end of reaction | 7.5 | 7.5 |
| Yield (kg) | 65 | 65 |

COMPARATIVE EXAMPLES 9–15

Comparative calcium carbonate was prepared by the same procedure as in Example 1 except that one of the conditions were changed as listed in Table 4.

TABLE 4

| Comparative Example | Condition | |
|---|---|---|
| 9 | Concentration of lime milk in the first carbonation step | 1.5 wt. % |
| 10 | Concentration of lime milk in the first carbonation step | 25 wt. % |
| 11 | Temperature of lime milk in the first carbonation step | 15° C. |
| 12 | Temperature of lime milk in the first carbonation step | 40° C. |
| 13 | Flow rate of $CO_2$-containing gas in the first carbonation step | 20 l/min |
| 14 | Flow rate of $CO_2$-containing gas in the second carbonation step | 2 l/min |
| 15 | Flow rate of $CO_2$-containing gas in the second carbonation step | 40 l/min |

Table 5 shows the properties of the calcium carbonates obtained in Examples 1–5 and Comparative Examples 1–15.

TABLE 5

|  | BET specific surface area ($m^2/g$) | BET specific surface area ($m^2/g$)/mean particle size ($\mu m$) | Oil absorption (ml/100 g) | Water absorption (g/g) |
|---|---|---|---|---|
| Ex. | | | | |
| 1 | 35 | 17 | 135 | 2.0 |
| 2 | 50 | 100 | 160 | 2.5 |
| 3 | 40 | 40 | 145 | 2.1 |
| 4 | 47 | 35 | 190 | 2.7 |
| 5 | 45 | 10 | 130 | 1.9 |
| Comp. Ex. | | | | |
| 1 | 30 | 150 | 100 | 1.6 |
| 2 | 10 | 2.5 | 60 | 1.3 |
| 3 | 15 | 7.5 | 70 | 1.4 |
| 4 | 30 | 130 | 90 | 1.6 |
| 5 | 78 | 28 | 100 | 1.7 |
| 6 | 64 | 120 | 95 | 1.6 |
| 7 | 34 | 150 | 86 | 1.4 |
| 8 | 29 | 146 | 80 | 1.2 |
| 9 | 7 | 2.3 | 49 | 0.9 |
| 10 | 5 | 1 | 40 | 0.6 |
| 11 | 58 | 193 | 70 | 1.4 |
| 12 | 12 | 2.0 | 55 | 1.2 |
| 13 | 20 | 4 | 100 | 1.6 |
| 14 | 28 | 3 | 90 | 1.7 |

TABLE 5-continued

| BET specific surface area (m²/g) | BET specific surface area (m²/g)/mean particle size (μm) | Oil absorption (ml/100 g) | Water absorption (g/g) |
| --- | --- | --- | --- |
| 15 | 33 | 150 | 90 | 1.5 |

FIG. 1 shows an electron photomicrograph (magnification 10,000X) of the calcium carbonate of the invention obtained in Example 1. The calcium carbonates of Examples 2 to 5 were similar to the carbonate of Example 1 in configuration. Table 5 and FIG. 1 indicate that the calcium carbonate of the invention is in the form of porous agglomerates of chain-like particles and has high ability to absorb oil and water.

EXAMPLE I

Coating compositions for forming the heat-sensitive recording layer of heat-sensitive recording paper were prepared by the following procedure using some calcium carbonates of the invention (those of Examples 1 to 3). The compositions were used for preparing heat-sensitive recording papers.

First, a colorless dye, phenolic compound and fatty acid amide were each separately milled into fine particles according to the following formulations A, B and C. For this purpose, ball mills were operated for 2 days.

| Formulation A | |
| --- | --- |
| 3-Diethylamino-6-methyl-7-anilinofluoran (product of Yamamoto Kagaku Gosei Co., Ltd., trademark "ONE DYE BLACK") | 100 parts |
| 5% Aqueous solution of polyvinyl alcohol | 500 parts |
| Formulation B | |
| Bisphenol A | 100 parts |
| 5% Aqueous solution of polyvinyl alcohol | 500 parts |
| Formulation C | |
| Fatty acid amide (trademark "ARMID HT-P," product of Lion AKZO Co., Ltd., m.p. 98° C., mixture of 22% palmitic acid amide, 75% stearic acid amide and 3% of oleic acid amide) | 100 parts |
| 5% Aqueous solution of polyvinyl alcohol | 500 parts |

According to the following formulation D, the calcium carbonate of the invention was made into a pigment dispersion containing 25% of solids using an impellar-type agitator.

| Formulation D | |
| --- | --- |
| Calcium carbonate | 100 parts |
| 5% Aqueous solution of polycarboxylic acid dispersant | 20 parts |
| 5% Aqueous solution of polyvinyl alcohol | 300 parts |
| Water | 40 parts |

The dispersion A to D prepared according to the formulations A to D were mixed together in the ratio by weight of A:B:C:D=1:5:3:5 to prepare coating compositions of the invention for forming a heat-sensitive recording layer.

Using a coating rod, the coating composition thus prepared was applied to one surface of wood-free paper, weighing 50 g/m², in the usual manner in an amount of 6 g/m² by dry weight. After drying the coating at room temperature, the coated paper was calendered to obtain heat-sensitive paper.

Table 6 showing the characteristics of the paper thus obtained indicates that the paper produced a color with a high density when heated but remained low in the residue color density on the transfer surface (high effect to remove residue) and had high whiteness retentivity.

COMPARATIVE EXAMPLE I

Comparative coating compositions for forming a heat-sensitive recording layer were prepared in the same manner as in Example I except that the comparative calcium carbonate obtained in Comparative Examples 1 to 5 were used. The compositions were used for preparing heat-sensitive recording paper. Table 6 shows the characteristics of the paper obtained. Table 6 also shows the result obtained using known calcium carbonate A.

EXAMPLE II

Some calcium carbonates of the invention (those of Examples 1 to 3) were used for forming the intermediate layer of heat-sensitive paper. The calcium carbonate was uniformly dispersed according to the following formulation to obtain a coating composition for forming the intermediate layer.

| Calcium carbonate | 100 parts |
| --- | --- |
| 5% Aqueous solution of polycarboxylic acid dispersant | 20 parts |
| 5% Aqueous solution of polyvinyl alcohol | 300 parts |
| Styrene-butadiene latex (brand name "SN-307," product of Sumitomo Naugatuck Co., Ltd., solids content 48%) | 20 parts |
| Water | 40 parts |

Using a coating rod, the coating composition was applied to one surface of wood-free paper, weighing 50 g/m², in the usual manner in an amount of 7 g,/m² by dry weight. After drying the coating, the coated paper was calendered to obtain pigment-coated paper.

Dispersions A, B and C prepared according to the formulations A to C in Example I were mixed together in the ratio by weight of A:B:C=1:5:3 to obtain a coating composition, which was then applied to the pigment-coated paper in an amount of 6 g/m² by dry weight using a coating rod. After drying the coating at room temperature, the resulting paper was calendered to obtain heat-sensitive recording paper having an intermediate layer. Table 6 showing the characteristics of the heat-sensitive recording paper thus prepared indicates that the paper was high in color density, residue removing effect and whiteness retentivity.

COMPARATIVE EXAMPLE II

Coating compositions for forming an intermediate layer were prepared in the same manner as in Example II except that the comparative calcium carbonates obtained in Comparative Examples 1 to 5 were used. Comparative heat-sensitive paper having an intermediate layer was obtained using each of the compositions The characteristics of the heat-sensitive recording paper thus obtained were shown in Table 6, which also shows the result achieved using known calcium carbonate A similarly.

TABLE 6

| | Color forming and residue preventing test[1] | | Preservability[2] |
|---|---|---|---|
| | Color density | Residue color density | (white paper) |
| Example I | | | |
| Ex. 1 | 1.27 | 0.08 | E |
| 2 | 1.30 | 0.06 | G |
| 3 | 1.28 | 0.07 | E |
| Comparative Example I | | | |
| Comp. Ex. 1 | 1.19 | 0.15 | F |
| 2 | 1.15 | 0.18 | F |
| 3 | 1.16 | 0.17 | F |
| 4 | 1.18 | 0.15 | F |
| 5 | 1.25 | 0.10 | P |
| Known calcium carbonate A | 1.20 | 0.14 | G |
| Example II | | | |
| Ex. 1 | 1.33 | 0.05 | E |
| 2 | 1.39 | 0.04 | E |
| 3 | 1.34 | 0.05 | E |
| Comparative Example II | | | |
| Comp. Ex. 1 | 1.24 | 0.12 | F |
| 2 | 1.20 | 0.15 | F |
| 3 | 1.21 | 0.14 | F |
| 4 | 1.23 | 0 12 | F |
| 5 | 1.26 | 0.08 | P |
| Known calcium carbonate A | 1.25 | 0.10 | G |

(1) Color forming and residue preventing test

The heat-sensitive paper to be tested was superposed on art paper with the color forming layer facing the latter paper, and the assembly was passed through the nip of heated calender rolls (130° C., pressure 50 kg/cm, feed speed 20 m/min) twice and thereafter checked for color density and also for residue color density to determine the effect to remove residue.

The term "color density" refers to the density of color produced on the surface of the color forming layer. The greater the value, the better. The term "residue color density" refers to the density of color on the surface of the transfer paper (art paper). The smaller the value, the greater is the effect to remove residue. In either case, the color density was measured using reflective densitometer, DM-400, for black-and-white and color use, product of Dainippon Screen Co., Ltd.

(2) Preservability

A piece of white recording paper was allowed to stand at 50° C. at RH of 90% for 24 hours. The degree of the resulting discoloration was determined according to the following criteria.

E: Very slight discoloration
G: Slight discoloration
F: Usual discoloration
P: Marked discoloration

EXAMPLE III

The calcium carbonate of the invention was used as a pigment for ink-jet recording paper. The ingredients given below were mixed together to obtain a uniform dispersion serving as a coating composition for ink-jet recording paper.

| | |
|---|---|
| Calcium carbonate | 100 parts |
| 5% Aqueous solution of polycarboxylic acid dispersant | 20 parts |
| 15% Aqueous solution of polyvinyl alcohol (brand name "PVA 117," product of Kuraray Co., Ltd.) | 200 parts |
| Water | 117 parts |

The coating composition was then applied to one surface of wood-free paper, weighing 67 g/m$^2$, in the usual manner in an amount of 10 g/m$^2$ by dry weight, using a coating rod. After drying the coating, the coated paper was calendered to obtain ink-jet recording paper.

The characteristics of the paper thus prepared were shown in Table 7, which reveals that unlike the ink jet recording paper prepared using a coating composition incorporating the comparative calcium carbonate, the paper rapidly absorbed ink without strike-through and was less likely to permit the ink to run, allowing the ink to form nearly circular satisfactory dots.

COMPARATIVE EXAMPLE III

A coating composition for ink-jet recording paper was prepared in the same manner as in Example III except that each of the comparative calcium carbonates obtained in Comparative Examples 1 to 5 was used. The composition was used in the same manner as in Example III to obtain ink-jet recording paper. Table 7 shows the characteristics of the paper. Table 7 also shows the result achieved when known calcium carbonate A was similarly used.

TABLE 7

| | Characteristics | |
|---|---|---|
| | Ink absorbability | Form of ink dots |
| Example III | | |
| Ex. 1 | E | G |
| 2 | E | E |
| 3 | E | G |
| Comparative Example III | | |
| Comp. Ex. 1 | F | P |
| 2 | P | P |
| 3 | P | P |
| 4 | F | P |
| 5 | F | F |
| Known calcium | P | P |

TABLE 7-continued

| | Characteristics | |
|---|---|---|
| | Ink absorbability | Form of ink dots |
| carbonate A | | |

The test results given in Table 7 were obtained by the following test methods using a commercial color ink for ink-jet printers (ink for Sharp IN-7200). Ink Absorbability The ink (0.5 μl) was placed dropwise onto the surface of the coated paper to be tested using a microsyringe. The paper was observed with the unaided eye to determine the rate of absorption of the ink and the degree of strike-through according to the following criteria.

E: Rapid absorption without strike-through
F: Slow absorption with diminished strike-through
P: Very slow absorption with strike-through Form of ink dots The degree of sidewise running of the ink from the ink dots formed on the paper as above was determined under a stereoscopic microscope according to the following criteria.

E: Nearly circular dots with greatly diminished running
G: Nearly circular dots with diminished running
F: Nearly circular dots with considerable running
P: Dots of indefinite form with marked running

We claim:

1. A calcium carbonate which is 25 to 55 m$^2$/g in BET specific surface area, 5 to 110 in the ratio of BET specific surface area (m$^2$/g)/mean particle size (μm), at least 120 ml/100 g in oil absorption as determined by the Ogura method and at least 1.8 g/g in water absorption.

2. A calcium carbonate pigment which is 25 to 55 m$^2$/g in BET specific surface area, 5 to 110 in the ratio of BET specific surface area (m$^2$/g)/mean particle size (μm), at least 120 ml/100 g in oil absorption as determined by the Ogura method and at least 1.8 g/g in water absorption.

3. A process for preparing a calcium carbonate as defined in claim 1 characterized in that the process comprises:

(i) the first carbonation step of introducing a gas containing at least 15 vol. % of carbon dioxide into an aqueous suspension of calcium hydroxide containing at least one member selected from the group consisting of chelating agents and water-soluble salts of anionic high-molecular-weight compounds and having a concentration of 3 to 20 wt. % and a temperature of 17° to 38° C., at a flow rate of at least 25 liters/min per kilogram of the calcium hydroxide to effect carbonation to a carbonation degree of 75 to 95%, and (ii) the second carbonation step of adding a chelating agent to the aqueous suspension resulting from the first carbonation step and introducing a gas containing at least 10 vol. % of carbon dioxide into the mixture at a flow rate of 5 to 25 liters/min per kilogram of the calcium hydroxide to effect carbonation.

4. A process as defined in claim 3 wherein said at least one selected member is used in an amount of 0.2 to 20 parts by weight per 100 parts by weight of the calcium hydroxide in the first carbonation step, and the chelating agent is used in an amount of 0.05 to 10 parts by weight per 100 parts by weight of the calcium hydroxide in the second carbonation step.

5. A coating composition for heat-sensitive recording paper which comprises the calcium carbonate defined in claim 1 in an amount of 5 to 60 wt. % about 3 to about 10 wt. % basic dye, about 15 to about 50 wt. % color developer, about 6 to about 30 wt. % chromogenic sensitivity adjusting agent and about 16 to about 22 wt. % binder based on the total solids content.

6. A coating composition useful for forming an intermediate layer of a heat-sensitive recording paper comprising a substrate, a heat-sensitive recording layer and an intermediate layer interposed therebetween wherein the composition of the intermediate layer comprises the calcium carbonate defined in claim 1 in an amount of 60 to 90 wt. % and about 10 to about 40 wt. % binder based on the total solids content.

7. A coating composition useful for ink-jet recording paper which comprises the calcium carbonate defined in claim 1 in an amount of 60 to 90 wt. % and about 10 to about 40 wt. % binder based on the total solids content.

* * * * *